United States Patent [19]  [11] Patent Number: 4,525,803
Vidalin et al.  [45] Date of Patent: Jun. 25, 1985

[54] METHOD FOR CONTROLLING THE COMPARISON TO BE EFFECTED BETWEEN REFERENCE LOGICAL ENTITIES AND LOGICAL ENTITIES ISSUING FROM A FILE

[75] Inventors: Jacques Vidalin, Montpellier; Jean L. Aucouturier, Gradignan, both of France

[73] Assignee: L'Universite de Bordeaux 1, Talence, France

[21] Appl. No.: 407,360

[22] Filed: Aug. 12, 1982

[51] Int. Cl.³ .......................... G06F 7/06; G06F 7/22; G06F 13/00
[52] U.S. Cl. ................................ 364/900; 340/146.2
[58] Field of Search ... 364/200 MS File, 900 MS File, 364/300; 340/146.2

[56] References Cited

U.S. PATENT DOCUMENTS

| | | | |
|---|---|---|---|
| 4,011,545 | 3/1977 | Nadir | 364/200 |
| 4,053,871 | 10/1977 | Vidalin et al. | 364/900 |
| 4,099,242 | 7/1978 | Houston | 364/200 |
| 4,152,762 | 5/1979 | Bird et al. | 364/200 |
| 4,221,003 | 9/1980 | Chang et al. | 364/900 |
| 4,241,402 | 12/1980 | Mayper, Jr. et al. | 364/200 |
| 4,267,568 | 5/1981 | Dechant et al. | 364/200 |
| 4,290,115 | 9/1981 | Pitt et al. | 364/900 |
| 4,366,551 | 12/1982 | Holtz | 364/900 |
| 4,384,325 | 5/1983 | Slechta, Jr. et al. | 364/200 |
| 4,433,392 | 2/1984 | Beaven | 364/200 |
| 4,439,840 | 3/1984 | Coleman et al. | 364/900 |
| 4,443,860 | 4/1984 | Vidalin | 364/900 |

FOREIGN PATENT DOCUMENTS

| | | | |
|---|---|---|---|
| 2289962 | 5/1976 | France | 364/200 |
| 2330075 | 5/1977 | France | 364/200 |
| 2421422 | 10/1979 | France | 364/200 |
| 2459512 | 1/1981 | France | 364/200 |
| 1497676 | 1/1978 | United Kingdom | 364/200 |
| 1497677 | 1/1978 | United Kingdom | 364/200 |
| 1497680 | 1/1978 | United Kingdom | 364/200 |

OTHER PUBLICATIONS

International Conference on Very Large Data Bases—Berlin Sep. 13 to 15, 1978—IEEE, Leilich: "A Search Processor For Data Base Management Systems".

Primary Examiner—Raulfe B. Zache
Assistant Examiner—William G. Niessen
Attorney, Agent, or Firm—Ostrolenk, Faber, Gerb & Soffen

[57] ABSTRACT

A method and system of selecting items of data from a stream of information by comparing the information to reference data. The reference data items are recorded in the form of logical entities in a two dimensional memory table. The reference logical entities of different types are stored vertically in different horizontal zones of the table in the order in which the entities of the same type are found in the file. In a control memory are stored, line-by-line, control information which specify the comparisons to be made between the reference logical entities and logical entities which are received from the file, as well as control information related to storage of logical entities received from the file and of operations including comparisons and storage between comparison results and other data contained in the table and information related to the linkage of processes for each control line of the control memory or from one control line to another. The method includes the steps of storing in each line of the control memory a data field specifying the existence of instruction loops and memorizing the number of beginnings and ends of loops to be executed. During execution of the method, the number of beginning loop operations and end loop operations is counted and compared to expected results which has been previously memorized. The comparison determines whether to continue looping or to restart at an immediate outer loop or to jump to another location on the same line of the control memory for execution of consecutive processing.

3 Claims, 1 Drawing Figure

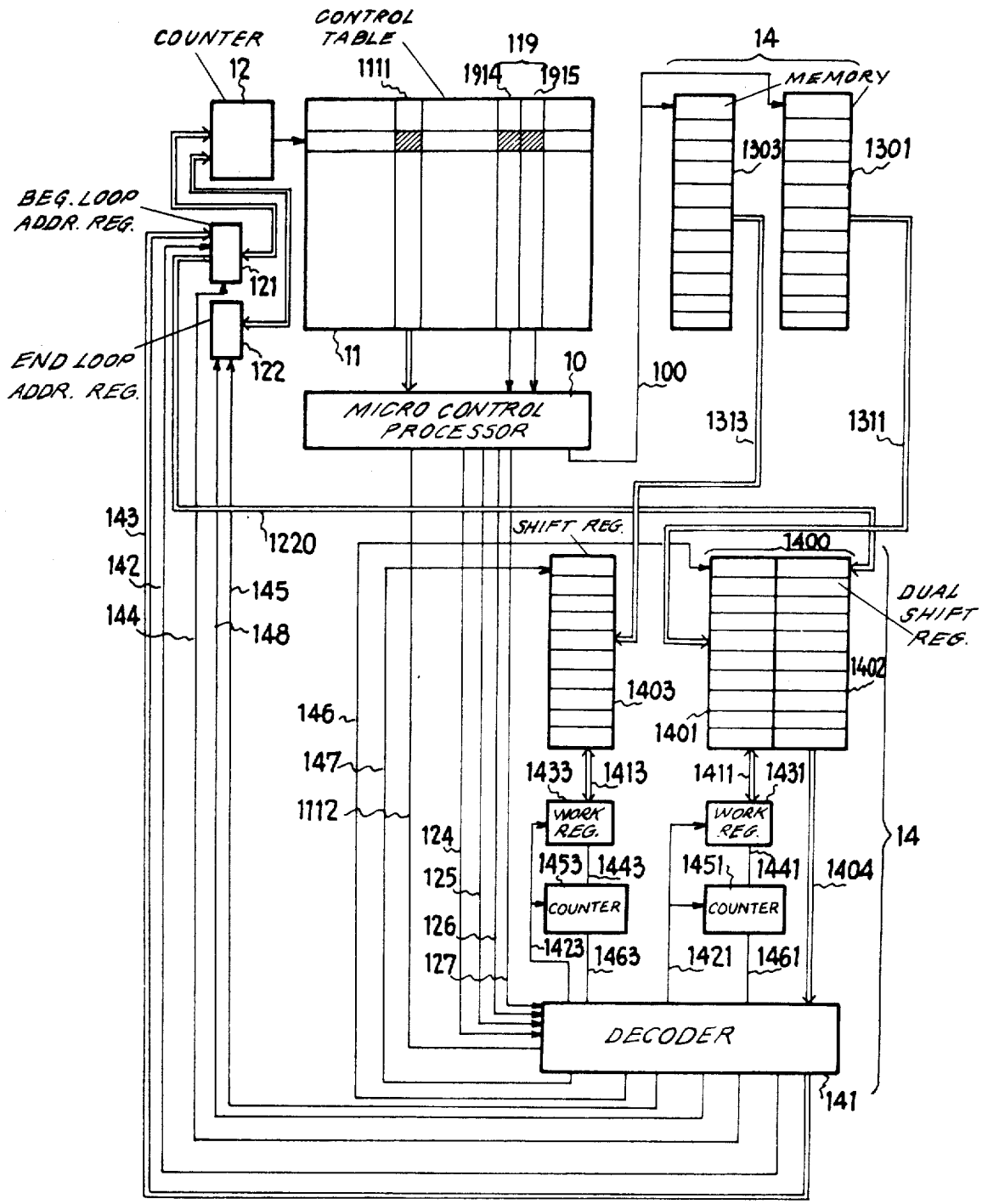

METHOD FOR CONTROLLING THE COMPARISON TO BE EFFECTED BETWEEN REFERENCE LOGICAL ENTITIES AND LOGICAL ENTITIES ISSUING FROM A FILE

BACKGROUND OF THE INVENTION

The present invention relates to a method for making comparisons between reference logical entities and logical entities proceeding from a source file.

A process of iterative and simultaneous comparison between reference data and data proceeding from a file is described in U.S. Pat. No. 4,053,871, which is incorporated herein by reference.

A file upon which a comparison is to be carried out includes data called logical entities consisting of items of information, for example, of octets. A logical entity is a group of related data elements and the terms "logical entity" or "data elements" may be used interchangeably. The logical entities are of fixed or variable length. For variable length logical entities or data elements, it is necessary to add to each logical entity a special character to indicate its end. The logical entities are gathered in sequences indentified by a particular label (or ticket, or title, . . . ) called a special logical entity. The sequences may be of fixed or variable length, that is to say, they may include a number of logical entities which may be fixed or not fixed. A special character is added to each sequence which has a variable length to indicate its end.

An iterative and simultaneous comparison consists of testing for and recognizing a relationship between each logical entity, special or not, proceeding from the source and a number of reference logical entities which can be made available simultaneously. The relationship is, for example, a relationship of equality, of inequality, of bracketing, etc.

For this purpose each logical entity proceeding from the source is matched, item of information by item of information, with the reference logical entities which appear in successive lines of a reference table. The results from the matchings are combined in order to provide a comparison result which determines which information is to be stored.

U.S. Pat. No. 4,443,860 relates to a method of control which is useful for carrying out the method of comparison described above and which can be applied to items of information contained in a file having any construction or file arrangement. The method can be executed or carried out at the frequency or speed at which the items of information are received from the source without the need for an external preprocessing marking. The controlling and simultaneous execution of the elementary functions connected with the comparisons and storage operations are carried out without interrupting the retrieval of information from the file. These elementary functions which are to be executed simultaneously relate to: the localization (identification) processing and transfer of the items of information proceeding from the source; the sequential linking of the groups of simultaneous operations; and the tests concerning the results obtained from the preceding comparisons.

The control method and the contents of the above mentioned U.S. Pat. No. 4,443,860 are herein incorporated by reference. The method disclosed therein essentially consists of the following steps:

(a) Reference logical entities are recorded in a reference table with logical entities of different types being stored vertically in different horizontal zones of the table. The reference logical entities are stored in the same order that the sequences of logical entities which they are to be compared appear, not necessarily in a consecutive fashion, in the source file. Each horizontal zone of the table contains reference logical entities of the same type drawn up in their turn vertically by columns. For example, a given zone will contain the five words of the sentence "I want to go home", each word (reference logical entity) being located in a respective line of its column. All of the words in this zone are related so that the reference logical entity will be considered of the same type. These entities will be compared to input logical entities also of the same type.

(b) In a control memory, the following is recorded line by line:

(1) First items of control information including, firstly, items of control information relating to the comparison to be carried out between input logical entities of the same type from the source file and reference logical entities located in a horizontal zone of the table corresponding with the line in the control memory in which the said items of comparison control information are recorded, and secondly items of control information relating to the storage of input logical entities proceeding from the source file, and (2) second items of information for control of operations to be carried out at the end of the comparison or comparisons effected with one or more items of input data elements from the file and/or from the storage of one or more items of input logical entities from the file, the items of information for control of operations including items of jump control information for controlling the linkage of the processes to be carried out;

(c) items of information from the source file are consecutively received; and (d) the operations are executed which correspond with the first items of control information from a first line in the control store, then the operations which correspond with the second items of control information from this line, amongst them especially the linkage onto another, not necessarily consecutive, line in the control store and if necessary onto a horizontal zone of the reference table corresponding with this other line.

U.S. Pat. No. 4,443,860 also shows that it is possible to record in at least one line of the control store items of control information related to the loops to be carried out for the processes corresponding with this line of the control store and to register in a storage memory first items of information related to the number of loops to be carried out for the processes and second items of information related to the jump to be carried out in the control store and if necessary in the reference table when the number of loops has been completed. As the input logic entities (data elements) are received from the source file, the number of the processes which have been completed for a given line of the control store, is counted and the operations which correspond with the information related to the jump process are executed when the number of processes completed is equal to the number of loops recorded.

SUMMARY OF THE INVENTION

The present invention relates to an improvement over the method disclosed in U.S. Pat. No. 4,443,860. The method is for controlling the comparison to be effected between reference logical entities and a stream of logical entities which are received from a file. Items of information included in the linkage field of a control line make it possible to control the repetitive processing to be executed on information while the information flows from the file by memorizing the information dealing with the sequence loop beginnings and loop ends corresponding to each line of the control table. The control information also includes instructions corresponding to the linkage to be performed at the end of execution of the loops.

Such a memorization of the beginning and end of loop restart points offers the advantage of not having to develop, step by step, the linkages related to and resulting from a file construction which includes imbricated loops as required by the method described in U.S. Pat. No. 4,443,860. Consequently the description, at the file level, of item structures and data organization of user data bases is greatly facilitated.

The control line table entry corresponding to the beginning of the loops to be executed will, for example, comprise the following linkage control code:

BS i.e.,: "beginning of sequence loops to be executed".

The control line corresponding, for example, to the end of the enveloped loops will comprise the loop instructions:

FB C i.e.,: "end of execution of sequence loops and jump to the consecutive processing on the control table".

The control line corresponding to the end of outer loops will, for example, include the instruction:

FB FA i.e.,: "end of execution of sequence loops and restart for item end".

For every process of the control table, the total number of imbricated or nested loops with the same origin on the control table, or the total number of loops with an end of the treatment process which corresponds to this line of the control table, is stored in dedicated or non-dedicated control memory storage locations.

The addresses corresponding to the restart linkages are stored in sequential storage locations at the beginnings of sequences. The addresses are proportional per line of control information. The jump addresses to consecutive process steps in the control table are stored, at the end of the sequence of a loop, in one register in which updated jump addresses are maintained.

Where, for example, 4 outer loops envelop 3 inner loops whose processing has the same origin on the control table as the 4 outer loops, the following will be used per line, in the dedicated store corresponding to the beginnings of the loops:

12 x i.e.,: "execution of 12 loops having the same origin address x on the control table". The code also includes the following, per line, in the dedicated memory corresponding to the ends of the loops:

3 y 4 z which correspond to the addresses y and z of each end of a loop operation and to a jump to a next address of the control table in which successive next addresses are stored. The above code stands for: "end of execution of 3 loops and jump to address y of the control table for consecutive processing; then end of execution of 4 loops and jump to address z of the control table for next processing to be done besides execution of a restart for end-of-item loop".

If the imbricated loops did not have the same origin, but on the contrary had the same end on the control table, the code is:

for the dedicated memory corresponding to the beginnings of loops, 4 x 3 y and for the dedicated store at the ends of the loops;

12 (z)

When the number of each of the loops to be handled by the above method is fixed either by the user or by the system, and when, similarly, the information whose processing is restarted by the looping operation is also of a fixed length, the restart or jump instruction for the processing of the consecutive datum in the running files may be executed automatically without memorization of the address. The above simplification does not apply to information which requires a random number of loops to be processed and which includes an end of data marker consisting of one or more separators. Addresses memorization of the control table entries corresponding to these ends of loops and jump instructions for indicating next datum to be processed make it possible to apply the method of the invention to partial as well as whole files which have a variable length and which include a random number of loops.

BRIEF DESCRIPTION OF THE DRAWING

The invention will be more readily understood in view of the following detailed description which refers to the accompanying drawing, in which:

The FIGURE shows the diagram of a circuit for effecting the method of the present invention.

DETAILED DESCRIPTION OF THE DRAWING

A detailed explanation of the control system shown and referred to in the present invention is provided in U.S. Pat. No. 4,443,860.

In the FIGURE, the items of information relative to the declaration of the sequence separator are provided in division 1111 of the corresponding line of the control table 11, as described in the above-mentioned U.S. Pat. No. 4,443,860. Similarly, the instructions which specify the linkages to be executed on the control table 11 are found in division 1914 and 1915 of the corresponding line of the control table 11.

Divisions 1914 contain the instructions for the execution of the beginning or end of a looping operation. Divisions 1915 contain instructions which are executed at the end of the looping operations and which specify an address for restarting the processing at either a more enveloping (outer) loop or at a jump location to continue processing in the control table 11.

These instructions are decoded by the micro-control processor 10 which generates control signals for use by the looping device 14.

The various circuit components of the looping device 14, and the interface between the looping device 14 and the overall device described in the aforementioned U.S. Pat. No. 4,443,860 are described below.

The looping device shown in the FIGURE encompasses all the circuits to which the vertical and horizontal brackets 14 point.

Two memories 1301 and 1303 are provided into which is loaded, in successive memory locations, a corresponding number of loops for register 1301 at each beginning of a loop operation and for register 1303 at each end of a loop operation. The memories are loaded during the recording of the program or in the course of instruction processing by the system.

A dual shift register 1400 including a first shift register 1401 in which the number of loops remaining are stored and a second shift register 1402 in which the restart address corresponding to each beginning of loop in the control table 11 is connected to the memory 1301. The line entries or line data in the dual shift register 1400 correspond to the same lines in the control table 11.

Another shift store 1403 in which is recorded per division for each end of loop the corresponding number of loops remaining to be effected is connected to the memory 1303.

Registers 121 and 122 are connected to the looping device 14 and are used for keeping the addresses of counter 12 of the control table 11. The beginnings of loop addresses are stored in register 121 and the ends of loop addresses are in register 122.

Counters 1451 and 1453 and their corresponding working registers 1431 and 1433 are provided between the dual register 1400/shift store 1403 and a decoder 141. The looping device 14 is interfaced to the microcontrol processor 10 and to address registers 121 and 122 through the decoder 141.

The various circuits referred to above cooperate to process each item of information as it is received from a file in accordance with control information which is present in the control table 11 as follows:

Through micro-control processor 10 and the link 100, the simultaneous copying of information contained in the divisions of memory 1301 into divisions of shift register 1401 via link 1311 and the copying of information contained in the divisions of the store 1303 via link 1313 into divisions of shift register 1403 is effected.

The initialization of shift registers 1400 and 1403 and of the counters 1451 and 1453 to values corresponding to identical values on memories 1301 and 1303 which refer to beginning of an item is carried out.

At the beginnings-of-loops, instructions contained in divisions 1914 of control table 11 via link 1924 and with decoder 141, control the copying of the address contained in the register 121 of the counter 12 into the corresponding division 1402 of the shift register 1400. This is done through control line 144 and link 1220.

The above circuits also act via links 1411 and 1441 and with working register 1431 to decrement the counter 1451 and to memorize or store the result in the working register 1431 into the same division 1401 of the shift register 1400.

Through link 146, at the end of execution of the processing corresponding to the line of the control table 11 in use, the shift in the sense of recording of store 1400 is also carried out.

End-of-loop instructions contained in the divisions 1914 of control table 11 via link 1925 and decoder 141 provide that:

At the beginning of the processing to be executed for the line corresponding to an end of loop in the control table 11, the shift in the opposite sense of store 1400 is effected by control 146.

The recording in register 122 of the address of the counter 12 of the control table 11 corresponding to this end of loop is effected by control 145.

via links 1413 and 1443 and with work register 1433, the decrementation of the counter 1453 and the memorization of the result by the working register in division 1401 of shift register 1400 is carried out.

The instructions in division 1915 of table 11 relate to linkages to be performed at the end of execution of loop operations and corresponding to a jump to be executed for continuing processing of instructions in the control table 11. These instructions control:

The initialization of counter 12 to the value contained in address register 122 for a result equal to 0 provided by line 1463 for counter 1453 and by link 1461 for counter 1451 by links 1926 and 148. A TRUE result provided for identification of the separator contained in division 1111 is available through link 1112.

The shift in the sense of recording of shift register 1400 and of shift register 1403 are controlled by links 146 and 147, respectively.

The instructions in division 1915 in table 11 relate to linkages to be executed at the end of execution of a loop operation and corresponding to the restart of the processing of an immediately enveloping or outer loop and control via link 1927 that:

For a result equal to 0 obtained through link 1461 for counter 1451 or for a TRUE result corresponding to the identification of the separator contained in division 1111 provided by link 1112, or, for a result different from 0 given by link 1463 for counter 1453;

the shift sense of shift register 1400 to be opposite that of recording; the initialization of the counter 12 to the value loaded into the register 121 by link 143 from the corresponding division 1402; and the execution of the corresponding restart in the control table 11. The above functions are controlled respectively via links 146 and 144 for the first two operations.

For a result equal to 0 given by link 1463 for the counter 1453 or, for a TRUE result corresponding to identification of the separator contained in division 1111 by link 1112 and for a result different from 0 given by link 1461 for counter 1451, the initialization of the counter 12 to the value contained in register 122; and the shift in the sense of recording to the consecutive processing of the control table 11 are controlled by links 1926/148 and 146, respectively.

Although the present invention has been described in connection with a preferred embodiment, many variations and modifications will now be apparent to those skilled in the art. It is preferred, therefore, that the present invention be limited not by the specific disclosure herein, but only by the appended claims.

What is claimed is:

1. A method for processing information received from a file which includes data elements of different types, each data element consisting of a fixed or variable number of items of information, each item of information in a given data element having a different respective order, data elements of a first type being arranged in sequences which are identified by a data element of a second type, said method comprising the steps of:

(A) storing reference data elements in a table logically divided into horizontal zones and vertical columns, each horizontal zones storing one or more reference data elements which are of a same said type and which are to be simultaneously compared to a data element received from the file such that each said horizontal zone is associated with reference data elements of a respective type, each reference data element consisting of a fixed or variable number of items of information, each item of information in a given reference data element having a different respective order, each reference data element being stored vertically in a respective vertical column of the horizontal zone in which it is located with each item of information of that reference data element being located in a respective line of that vertical column, and the vertical order of said horizontal zones following the order in which the data elements of types corresponding to said zones appear in said file;

(B) storing control information in a control memory which is logically divided into a plurality of lines, each line of said memory containing:
  (1) first items of control information including: comparison control information identifying the type of comparison to be made between data elements of a same type received from said file and reference data elements of this type stored in a horizontal zone of said table, which zone corresponds to the line of the memory wherein said comparison control information is stored; and storage control information relating to the storage of the data elements received from said file; and
  (2) second items of control information identifying operations to be carried out when a comparison operation is completed between one or more data elements received from the file and one or more corresponding reference data elements in said table, said second items of control information including jump control information identifying the next line in said control memory and/or the next horizontal zone in said table which is to be jumped to;

(C) sequentially receiving items of information from said file;

(D) executing the operations of comparison and/or storage identified by the first items of control information stored in a first line of said control memory, jumping to the next line of said control memory identified by the jump control information stored in said first line of said control memory and then executing the operations identified by the items of control information stored in said next line of said control memory, each operation of comparison being carried out by simultaneously comparing each item of information of a received data element with each item of information of the same order of each reference data element of the same type as the received data element, said step of executing operations of comparison and/or storage being carried out without interrupting the receipt of data elements from said file, each item of information received from the file initializing the execution of the operations controlled by the control information contained in said control memory and relating to this item of information;

(E) storing in each line of said control memory a data field specifying the existence, if any, of beginnings and ends of loops for said item of information and linkage instructions for linkings, if any, to be effected on said control memory at the end of each execution of a control memory processing;

(F) memorizing, for each line of said control memory: the number of said beginnings and ends of loops to be executed; the restart address for each loop; and the jump address to the consecutive processing on the control table;

(G) counting the number of beginning of loop operations associated with the execution of each control line instruction;

(H) counting the number of end of loop operations associated with the execution of each control line instruction;

(I) comparing the result of said counting steps with said data field; and (J) determining, depending on the result of said comparing and on instructions contained in the same line of said control memory, whether to continue looping at the same loop or restart operation at an immediate outer loop or jump to another control table location to execute instructions corresponding to consecutive processing.

2. A device for processing information received from a file which includes data elements of different types, each data element consisting of a fixed or variable number of items of information, each item of information in a given data element having a different respective order, data elements of a first type being arranged in sequences which are identified by a data element of a second type, said device comprising:

(A) a table in which reference data elements are stored, said table being logically divided into horizontal zones and vertical columns, each horizontal zone storing one or more reference data elements which are of the same one of said types and which are to be simultaneously compared to data elements of that type received from the file such that each horizontal zone is associated with reference data elements of a respective type, each reference data element consisting of a fixed or variable number of items of information, each item of information being given a reference data element having a different respective order, each data element being stored vertically with each item of information of that reference data element being located in a respective line of that vertical column, and the vertical order of said horizontal zone following the order in which the data elements of types corresponding to said zones appear in said file;

(B) a control memory separate from said table and in which control information is stored, said control memory being logically divided into a plurality of lines, each line of said memory containing:
  (1) first items of control information including: comparison control information identifying the type of comparison to be made between data elements of a same type received from said file and reference data elements of this type stored in a horizontal zone of said table, which zone corresponds to the line of the memory wherein said comparison control information is stored; and control storage information relating to the storage of the data elements received from said file; and (2) second items of control information identifying operations to be carried out when a comparison operation is completed between one or more data elements received from the file and one or more corresponding reference data elements in said table, said second items of control information including jump control information identifying the next line in said control memory and/or the next horizontal zone in said table which is to be jumped to;

(C) operating units each having a first input connected to receive the items of information of the file and a second input connected to receive the items of information stored in a respective column of said table;

(D) a control circuit connected to said control memory for delivering control signals corresponding to the items of control information stored in said memory so as to execute the operations of comparison and/or storage identified by the first items of control information stored in a first line of said control memory, to jump to the next line of said control memory identified by the jump control information stored in said first line of said control memory and then to execute the operations identified by the items of control information stored in said next line of said control memory, each operation of comparison being carried out in said operating units by simultaneously comparing each item of information of a received data element with each item of information of the same order of each reference data element of the same type as the received data element, the operations of comparison and/or storage being carried out without interrupting the receipt of data elements from said file, each item of information issued from the file being applied to said control circuit for initializing the execution of the operation controlled by the control information contained in said control memory and relating to this item of information;

(E) means for storing, in each line of said control memory, a data field specifying the existence, if any, of beginnings and ends of loops for said items of information and linkage instructions for linking, if any, to be effected on said control memory at the end of each execution of a control memory processing;

(F) means for memorizing, for each line of said control memory: the number of said beginnings and ends of loops to be executed; the restart address for each loop; and the jump address to the consecutive processing on the control table;

(G) means for counting the number of beginning of loop operations associated with the execution of each control line instruction;

(H) means for counting the number of end of loop operations associated with the execution of each control line instruction;

(I) means for comparing the result of said counting steps to said data field; and (J) means for determining, depending on the result of said comparing and on instructions contained in said line of said control memory, whether to continue looping or to restart the operation corresponding to the immediate enveloping loop or jump to another control table location to execute instructions corresponding to consecutive processing.

3. The device of claim 2, wherein said means for counting the number of beginning of loop operations and said means for counting the number of end of loop operations comprises counters for counting and a dual shift register for storing the number of beginning of loops remaining and the restart address corresponding to each beginning of loop, and another shift register for storing therein the number of end of loops remaining.

* * * * *